United States Patent
Hong

(10) Patent No.: US 8,925,162 B2
(45) Date of Patent: Jan. 6, 2015

(54) LOCKING HOOK

(71) Applicant: Yoke Industrial Corp., Taichung (TW)

(72) Inventor: Rong-Der Hong, Taichung (TW)

(73) Assignee: Yoke Industrial Corp., Taichung (TW)

( * ) Notice: Subject to any disclaimer, the term of this patent is extended or adjusted under 35 U.S.C. 154(b) by 258 days.

(21) Appl. No.: 13/691,229

(22) Filed: Nov. 30, 2012

(65) Prior Publication Data

US 2014/0090214 A1    Apr. 3, 2014

(30) Foreign Application Priority Data

Oct. 3, 2012    (TW) .............................. 101136545 A

(51) Int. Cl.
*F16B 45/02*    (2006.01)

(52) U.S. Cl.
CPC .................................... *F16B 45/02* (2013.01)
USPC ...................... 24/600.2; 294/82.21

(58) Field of Classification Search
CPC ....................................... F16B 45/02
USPC ............................. 24/600.2; 294/82.19, 82.21
See application file for complete search history.

(56) References Cited

U.S. PATENT DOCUMENTS

| | | | | | |
|---|---|---|---|---|---|
| 1,334,830 | A | * | 3/1920 | Bastord | 294/82.21 |
| 1,376,258 | A | * | 4/1921 | Cox | 294/82.21 |
| 1,595,264 | A | * | 8/1926 | Treiman | 294/82.21 |
| 1,660,927 | A | * | 2/1928 | Larsen | 24/600.2 |
| 3,911,671 | A | * | 10/1975 | Guillen | 24/600.2 |
| 3,940,173 | A | | 2/1976 | Ulbing | |
| 2013/0097822 | A1 | * | 4/2013 | Mayberry et al. | 24/509 |

* cited by examiner

*Primary Examiner* — Robert J Sandy
(74) *Attorney, Agent, or Firm* — Ming Chow; Sinorica, LLC

(57) ABSTRACT

A locking hook includes a hook member, a lock member, and a latch member. The lock member is pivoted on the first portion of the hook member to be turned between a first position and a second position. The latch member is provided on the operating portion of the hook member to be moved between a lock position and an unlock position to secure and release the lock member. The hook member further has a gripping portion for a user to grip the hook member. Therefore, the user grips the gripping portion instead of the hook member, and this may prevent the user from being hurt accidentally by the object hung on the hook member.

4 Claims, 10 Drawing Sheets

LOCKING HOOK

BACKGROUND OF THE INVENTION

1. Field of the Invention

The present invention relates generally to a connector, and more particular to a convenient and secure locking hook.

2. Description of the Related Art

A conventional hook is used to firmly hang a specific object. In order to avoid the object falling off the hook, some hooks are provided with a lock to close an opening of the hook, therefore the object will never escape from the hook. An improved hook is provided with a latch to make sure the lock can only be unlocked in certain ways.

U.S. Pat. No. 3,940,173 taught a safety hook, which has a latch-operator member with a generally cylindrical latch end portion and a generally cylindrical reduced diameter, intermediate connecting portion. The safety hook further has a keeper with a rib portion which works with the latch-operator member, so that the latch-operator member can be operated to lock or unlock the keeper to achieve aforesaid function.

As shown in FIG. 1, the safety hook is provided with two thumb receiving grooves 61 on opposite sides of the body portion 62 of the hook for the user to grip the hook and operate the latch-operator member 63. However, the thumb receiving grooves 61 are insufficient for user to hold the hook firmly and stably, so that the user usually grips the body portion 62 of the hook instead of the thumb receiving grooves 61. And this puts the user at risk of being hurt when a heavy object is hung on the hook.

SUMMARY OF THE INVENTION

The primary objective of the present invention is to provide a locking hook, which has a simple structure, an easy way of use, and a safety operation during hooking task.

According to the objective of the present invention, the present invention provides a locking hook including a hook member, a lock member, and a latch member. The hook member has a first portion, a second portion, and a gripping portion. The gripping portion has at least a connecting portion and a hollow portion for a user to grip the gripping portion. The connecting portion has an end affixed to the first portion. The first portion has an operating portion on a side thereof, wherein a width of the operating portion is substantially equal to a width of the end of the connecting portion. The lock member is pivoted on the first portion of the hook member to be turned between a first position and a second position. The lock member has an end portion and a protrusion. The end portion touches the second portion of the hook member when the lock member is turned to the first position. The protrusion is moved in a moving path as the lock member is turned between the first position and the second position. The moving path is a curve path with a center of curvature. The lock member 20 has a center of rotation, which is identical to the center of curvature of the moving path of the protrusion 28. The protrusion has a stop face. The latch member is provided on the operating portion of the hook member to be moved between a lock position and an unlock position. A moving path of the latch member is parallel to the center of rotation of the lock member. The latch member has a large diameter portion and a small diameter portion. When the latch member is located at the lock position and the lock member is located at the first position, the large diameter portion is situated on the moving path of the protrusion and touches the stop face of the protrusion to secure the lock member against leaving the first position.

Therefore, the user grips the gripping portion instead of the hook member, so that the locking hook may prevent the user from being hurt accidentally by the object hung on the hook member.

DETAILED DESCRIPTION OF THE INVENTION

Figure 1:
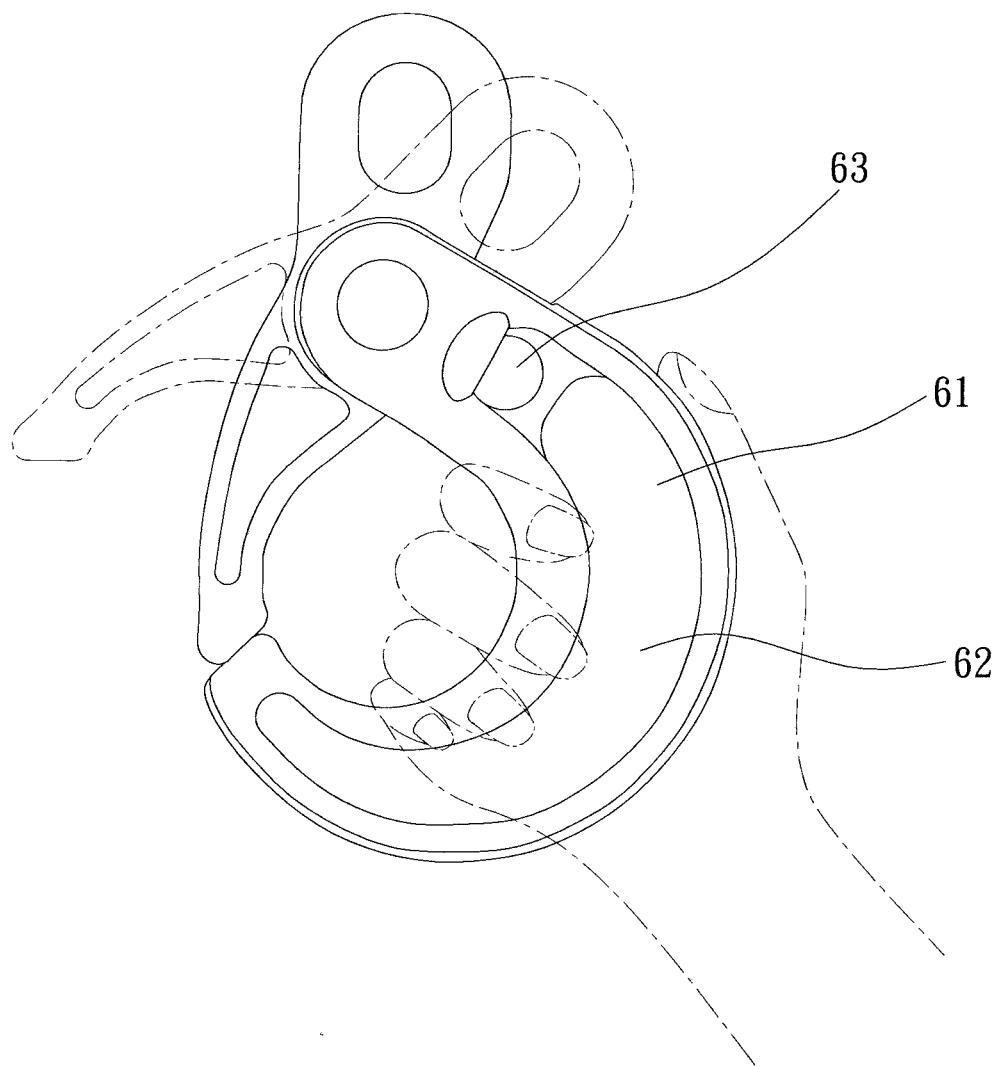
FIG. 1 is a front view of the conventional safety hook.
Figure 2:
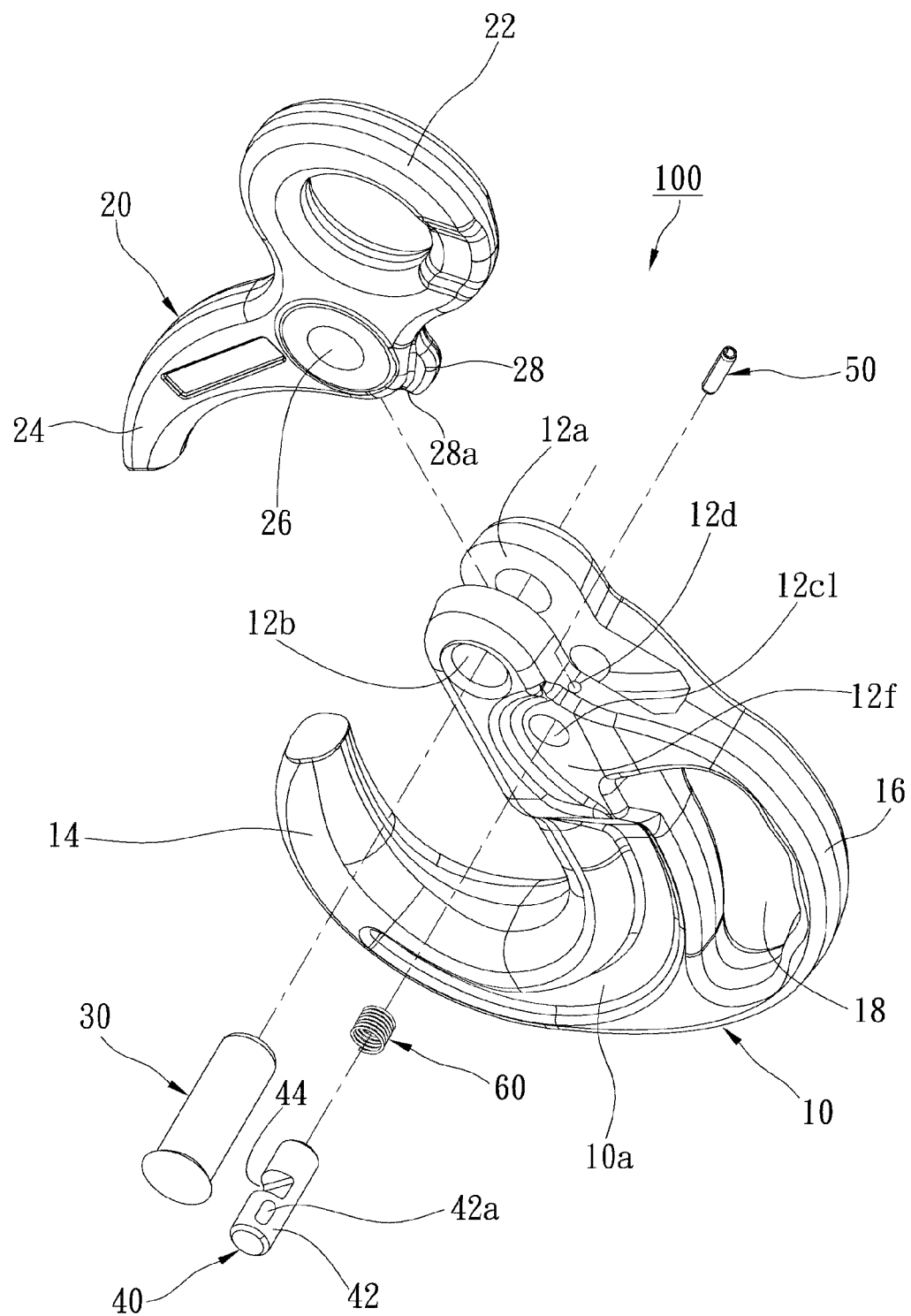
FIG. 2 is an exploded view of a preferred embodiment of the present invention.
Figure 3:
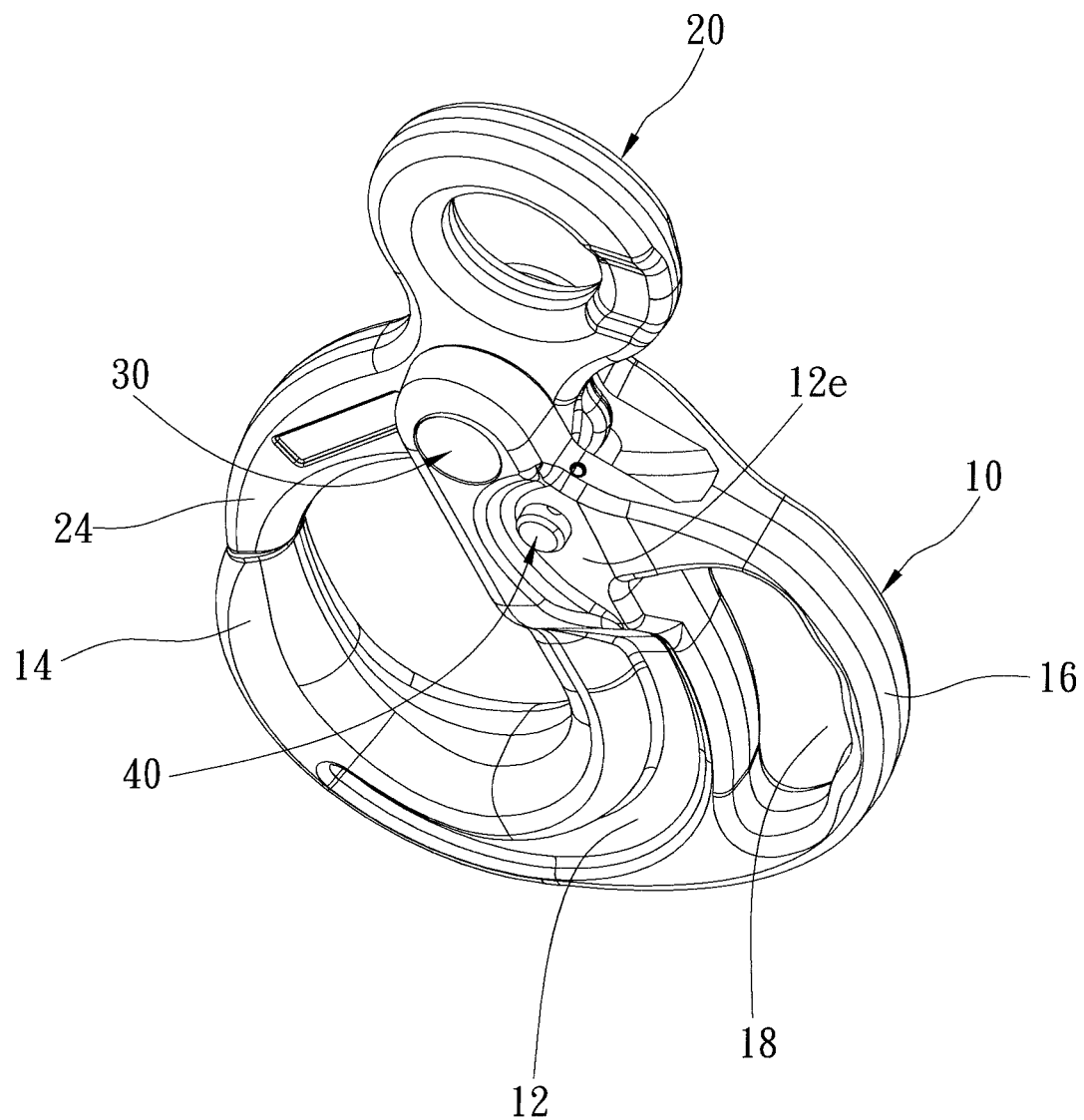
FIG. 3 is a perspective view of the preferred embodiment of the present invention.
Figure 4:
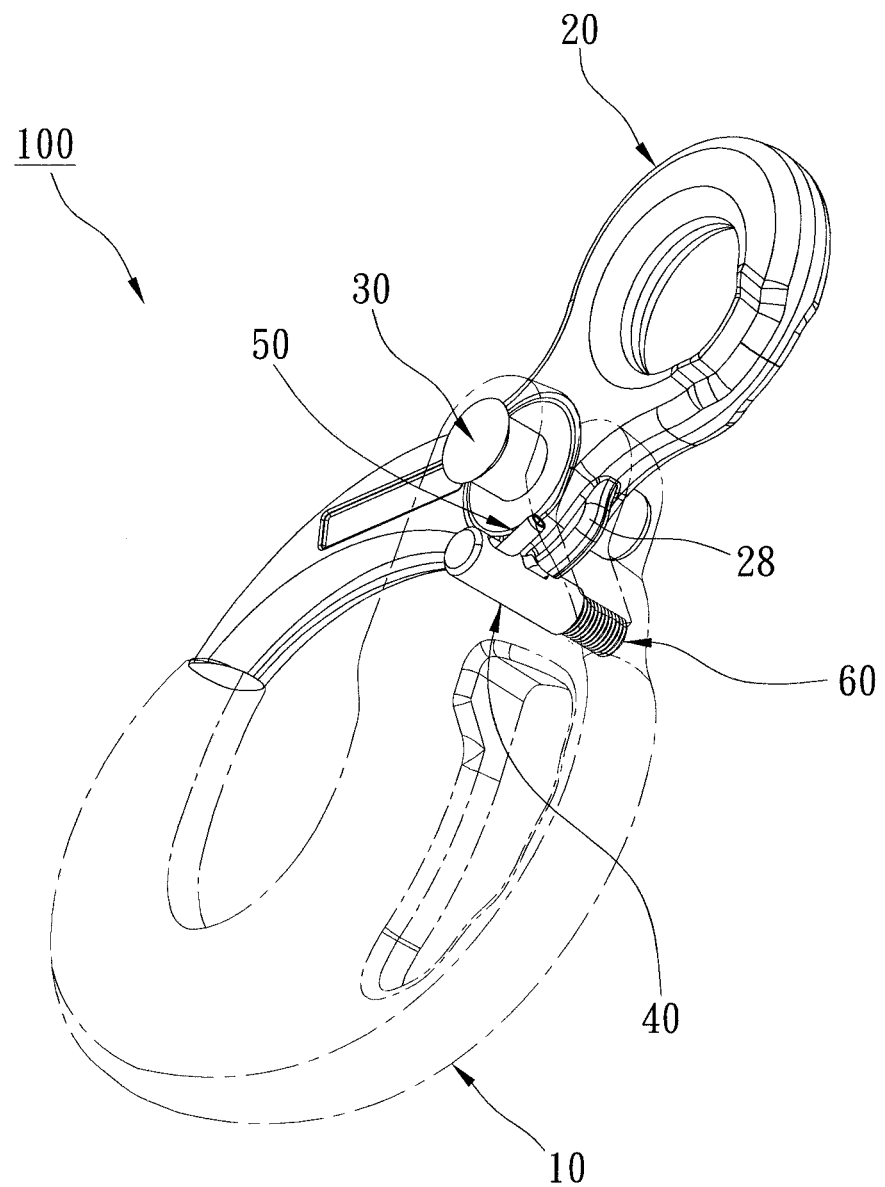
FIG. 4 is a perspective view of the preferred embodiment of the present invention, showing the hook member in dot lines.
Figure 5:
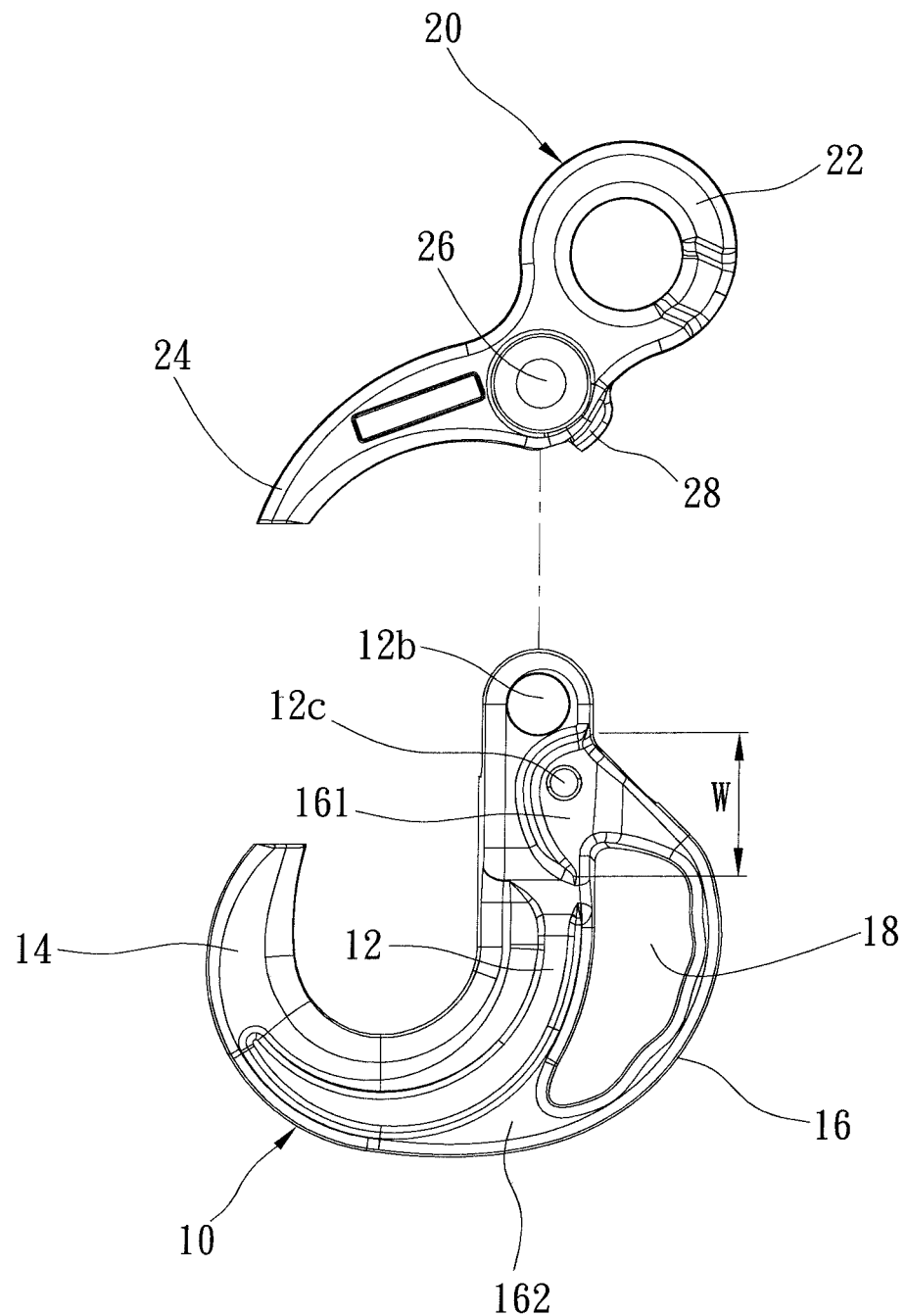
FIG. 5 is a lateral view of the preferred embodiment of the present invention, showing the hook member and the lock member.

The detailed description and technical contents of the present invention will be explained with reference to the accompanying drawings. However, the drawings are for illustration only and cannot be used to limit the present invention.

As shown in FIG. 2 to FIG. 5, a locking hook 100 of the preferred embodiment of the present invention, which may be applied to hang a heavy object, includes a hook member 10, a lock member 20, a shaft 30, a latch member 40, a pin 50, and a spring 60.

Figures 6, 7:
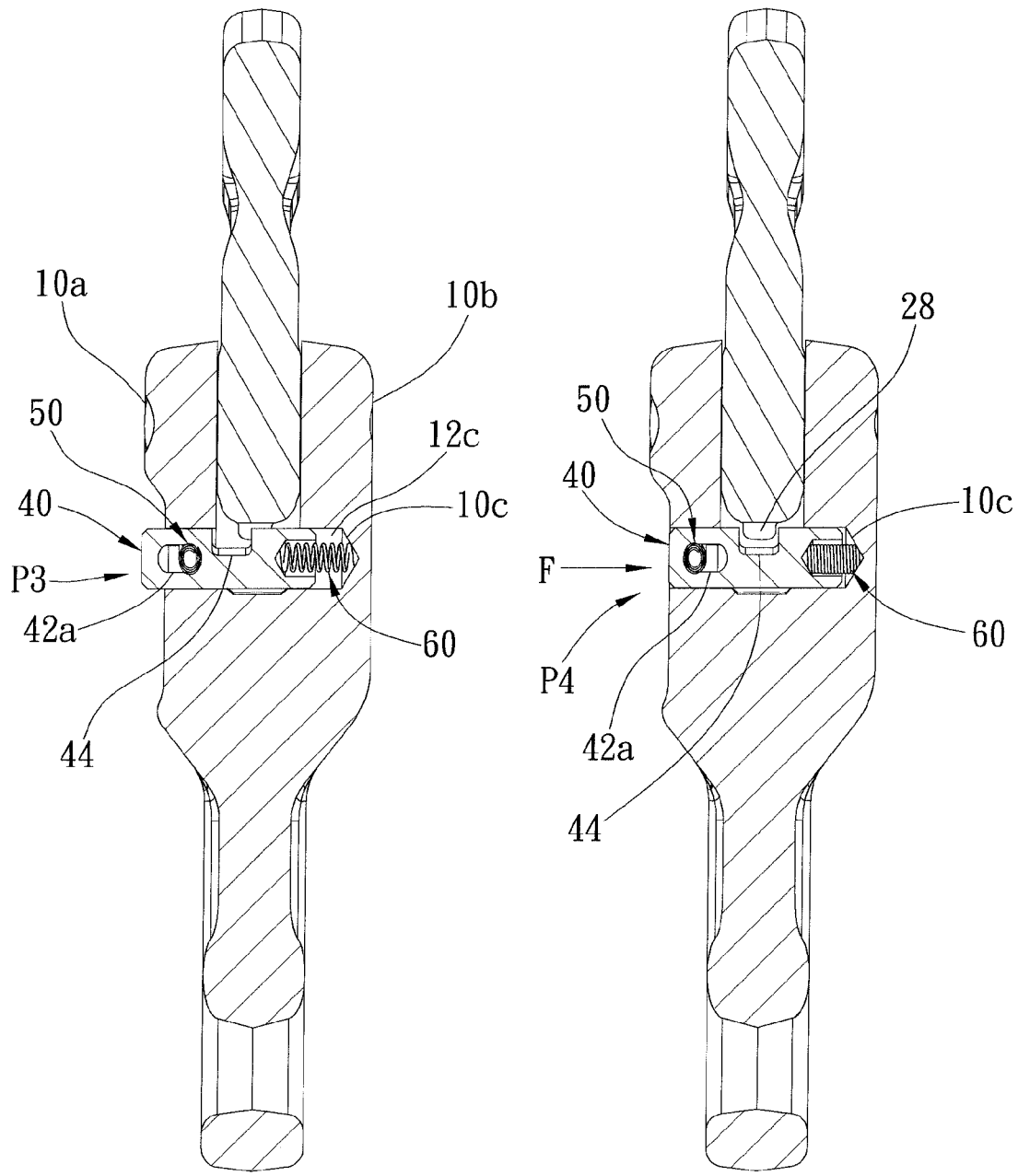
FIG. 6 is a sectional view of the preferred embodiment of the present invention, showing the latch member of the lock member at the lock position.
FIG. 7 is a sectional view of the preferred embodiment of the present invention, showing the latch member of the lock member at the unlock position.

As shown in FIG. 6 and FIG. 7, the hook member 10 has a left side 10a and a right side 10b. The hook member 10 further has a first portion 12, a second portion 14, and a gripping portion 16. In the present embodiment, the second portion 14 has a hook-like shape to hang an object.

The gripping portion 16 has a curved shape in the present embodiment. The gripping portion 16 has a first connecting portion 161 and a second connecting portion 162. Both the first and the second connecting portions 161 and 162 are connected to the first portion 12. Widths of the first and the second connecting portions 161 and 162 are gradually increasing, so that the first and the second connecting portions 161 and 162 respectively have an end with a large area to connect to the first portion 12 to firmly connect the gripping portion 16 to the first portion 12. There is a hollow portion 18 between the gripping portion 16 and the first portion 12 for a user to hold the gripping portion 16.

The first portion 12 has an operating portion 12e on a side thereof. The operating portion 12e has a width W which is substantially equal to the width of the end of the first connecting portion 161. The operating portion 12e has a surface 12f which is lower than the left side 10a.

The first portion 12 gas a slot 12a, a bore 12b, a through hole 12c, and a pin hole 12d. The slot 12a is set on a top of the hook member 10. The bore 12b and the through hole 12c respectively are communicated with the slot 12a. The through hole 12c is on the operating portion 12e, and an end of the through hole 12c is on the surface 12f to form an opening 12c1. The other end of the through hole 12c extends toward the right side 10b but does not arrive the right side 10b, which means that the other end of the through hole 12c is closed to form a stop face 10c. The pin hole 12d is communicated with the through hole 12c.

Figure 8:
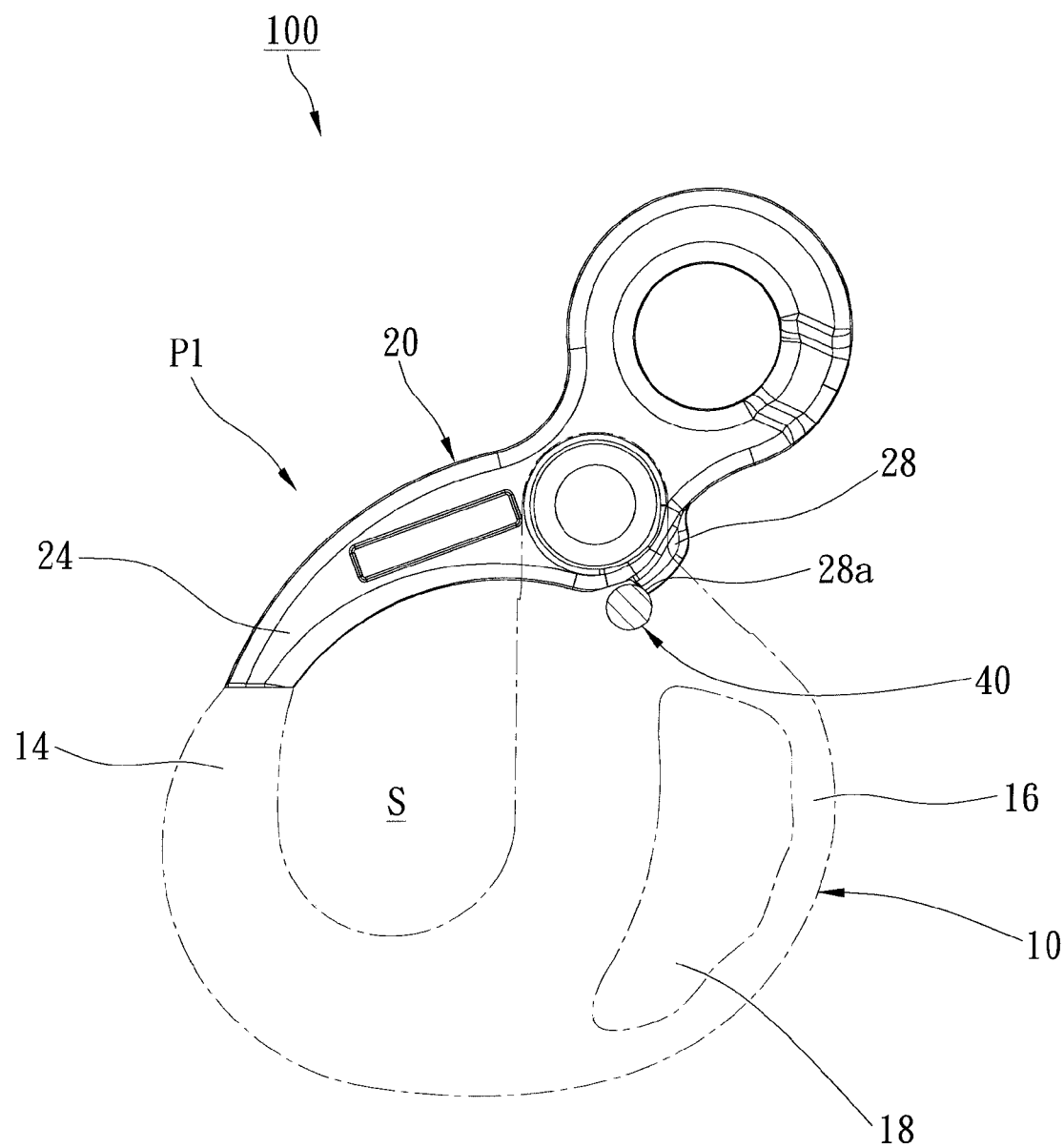
FIG. 8 is a lateral view of the preferred embodiment of the present invention, showing the lock member at the first position.
Figure 9:
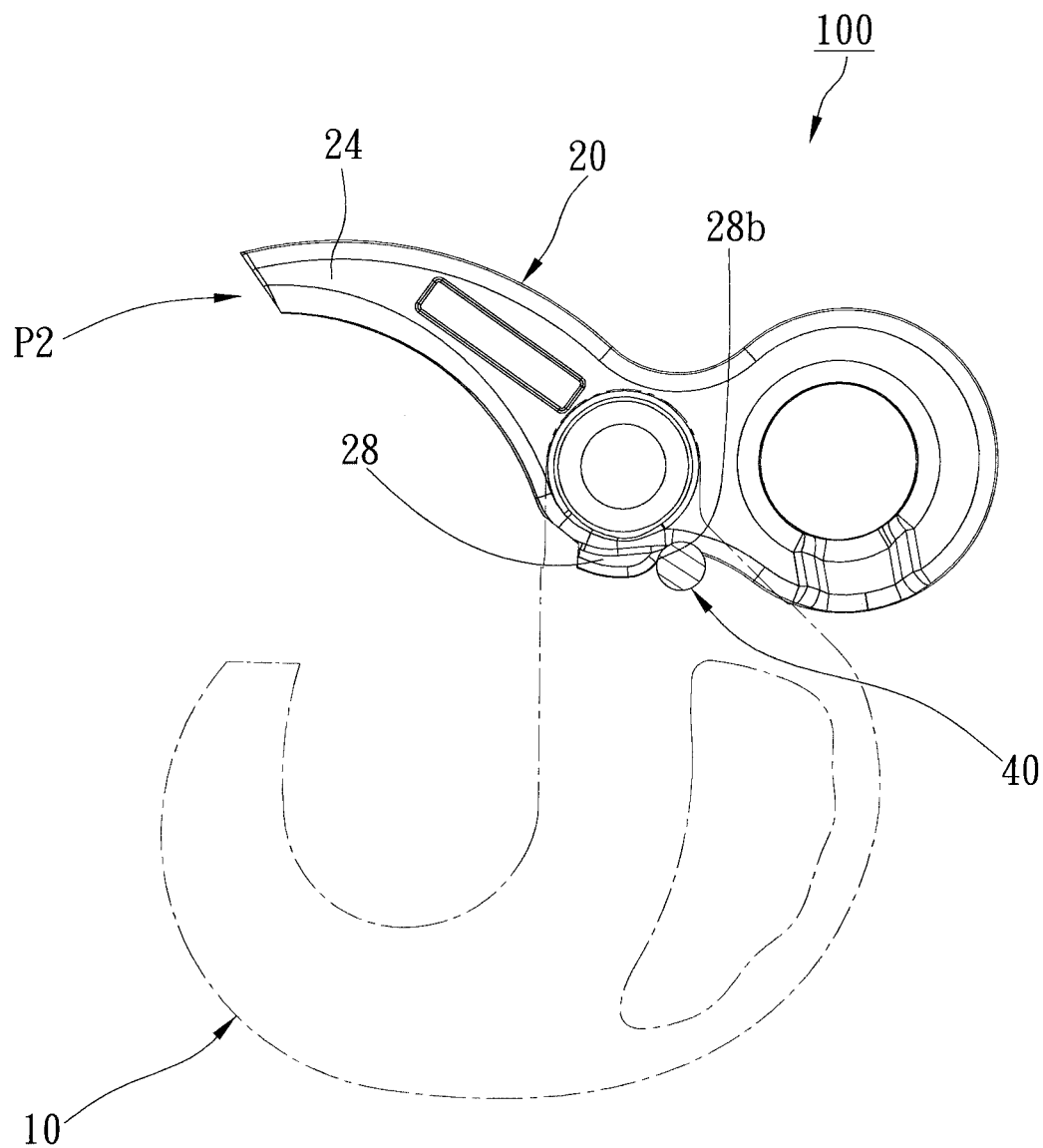
FIG. 9 is a lateral view of the preferred embodiment of the present invention, showing the lock member at the second position.

The lock member 20 is received in the slot 12a of the hook member 10. The shaft 30 passes through the bore 12b and a bore 26 of the lock member 20, so that the lock member 20 is pivoted on the first portion 12 of the hook member 10. The lock member 20 may be turned between a first position P1 (FIG. 8) and a second position P2 (FIG. 9). The lock member 20 has a ring 22, an end portion 24, and a protrusion 28. The ring 22 may engage a rope or another hook. The end portion 24 is projected from the ring 22 to touch the second portion 14 of the hook member 10 when the lock member 20 is at the first position P1 (FIG. 8). At this time, there is a closed space S formed between the end portion 24 and the hook member 10 to prevent an object hung on the hook member 10 from escaping. The protrusion 28 is moved along with the lock member 20 between the first position P1 and the second position P2 in a moving path, and the moving path is a curved path with a center of curvature. The lock member 20 has a center of rotation, which is identical to the center of curvature of the moving path of the protrusion 28. The protrusion 28 has a stop face 28a.

The latch member 40 and the spring 60 are received together in the through hole 12c of the hook member 10. The spring 60 has opposite ends against the stop face 10c and the latch member 40 to urge the latch member 40 outwardly. The latch member 40 is parallel to the shaft 30. The latch member 40 has a large diameter portion 42 and a small diameter portion 44. The latch member 40 is milled transversely to obtain a slot, and under the slot is the small diameter portion 44. The large diameter portion 42 is provided with an elongated slot 42a thereof. The pin 50 passes through the pin hole 12d of the hook member 10 and enters the elongated slot 42a whereby the latch member 40 is restricted to be moved between a lock position P3 (FIG. 6) and an unlock position P4 (FIG. 7). For further explanation, when the latch member 40 is at the lock position P3 (FIG. 6) and the lock member 20 is at the first position P1 (FIG. 8), the large diameter portion 42 is located on the moving path of the protrusion 28, and touches the stop face 28a of the protrusion 28. As a result, the lock member 20 is restricted by the latch member 40 and cannot be moved to second position P2. This may prevent the object hung on the hook member from escaping.

When a user presses the latch member 40 with a force F to compress the spring 60, the latch member 40 will be moved to the unlock position P4 (FIG. 7). At this time, the large diameter portion 42 leaves the path of the protrusion, therefore the lock member 20 is free to be moved and the end portion 24 of the lock member 20 may leave the second portion 14 of the hook member 10, so that a user may hang an object on the hook member 10 or take the object off the hook member 10.

Figure 10:
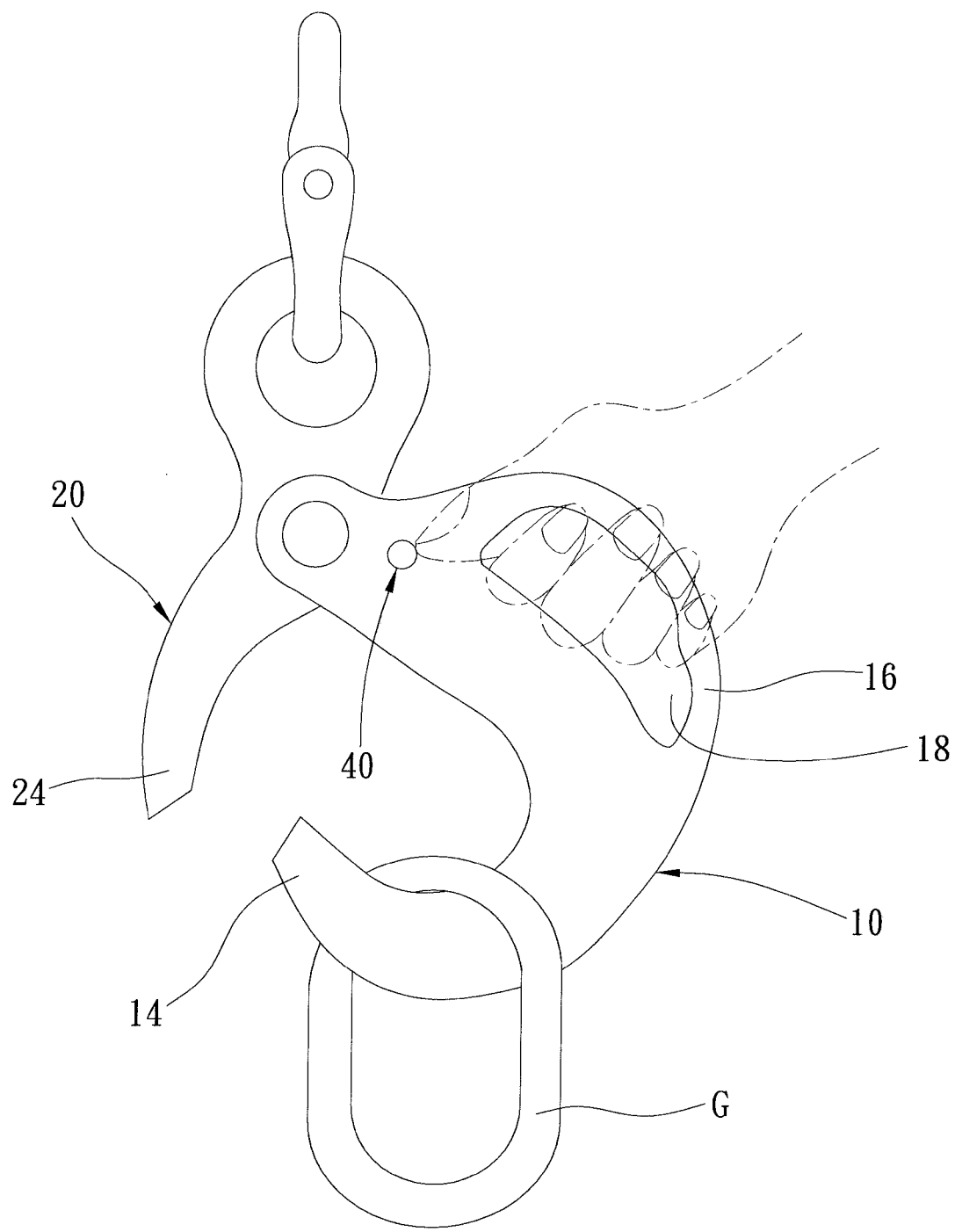
FIG. 10 is a lateral view of the preferred embodiment of the present invention, showing the operation of the locking hook.

As shown in FIG. 10, in operating the locking hook of the present embodiment, a user may hold the gripping portion 16 by forefinger, middle finger, ring finger, and little finger, and put the thumb on an end of the latch member 40, and then press the latch member 40 into the through hole 12c to make the large diameter portion 42 leave the stop face 28a of the protrusion 28 and the path of the protrusion 28. At this time, a user may lift up the hook member 10, and that may move the second portion 14 of the hook member 10 off the end portion 24 of the lock member 20 to hang an object G on the hook member 10 or to take the object G off the hook member 10.

Figure 11:
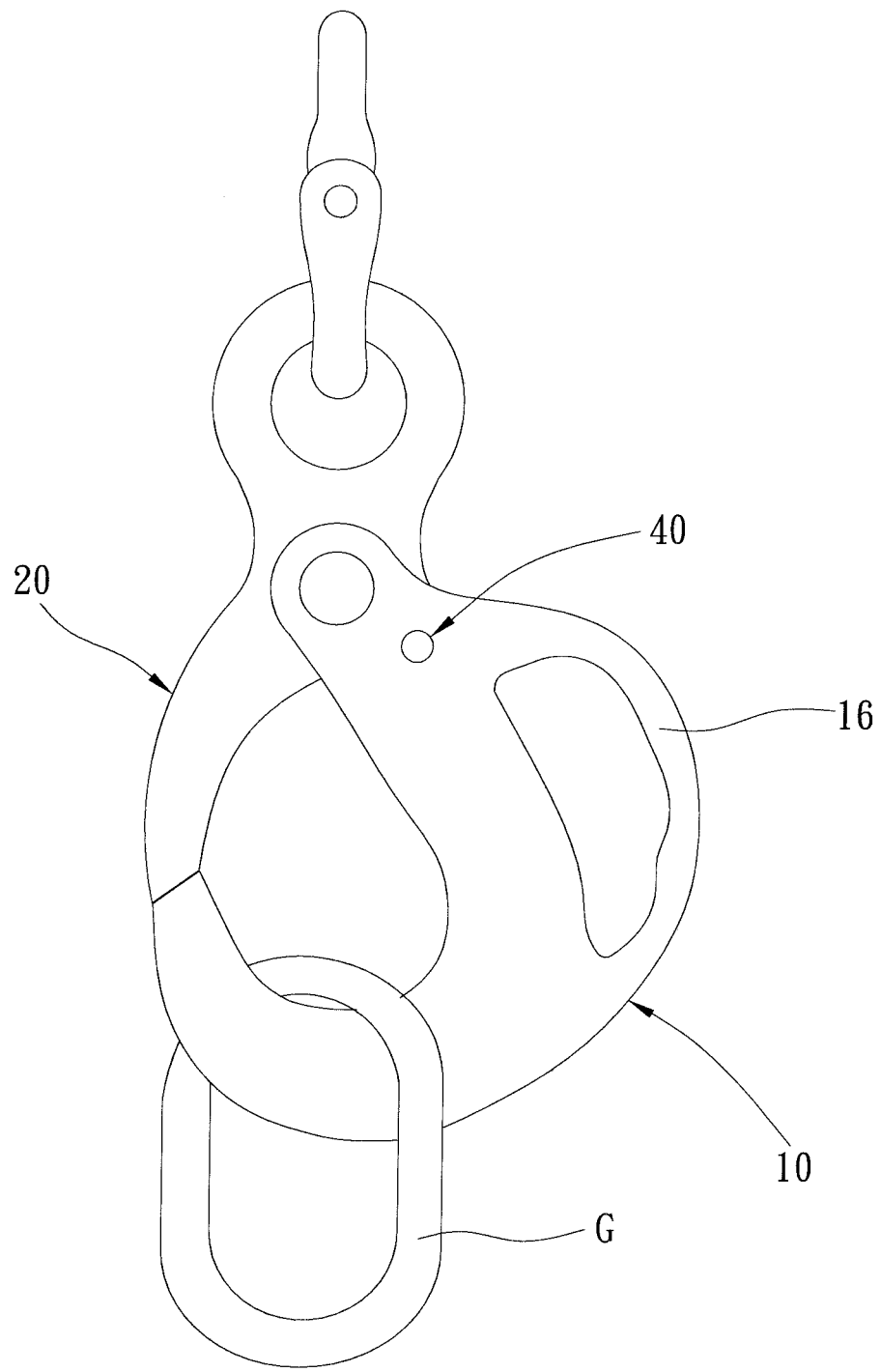
FIG. 11 is a lateral view of the preferred embodiment of the present invention, showing the lock member locking the hook member again.

As shown in FIG. 11, when the object G is hung on the hook member 10, the lock member 20 will lock the hook member 10 automatically as long as the user moves the thumb off the latch member 40. When the user moves the thumb off the latch member 40, the latch member 40 will return to the lock position P3 because of the spring 60. At this time, the large diameter portion 42 is located on the path of the protrusion 28 and touches the stop face 28a to restrict the lock member 20 at the first position P1, therefore the second portion 14 of the hook member 10 will never leave the end portion 24 of the lock member 20, and the object can be ensured not to escape.

In operation of the locking hook 100 of the present invention, the user grips the gripping portion 16 instead of the hook member 10, and this may protect the user from being hurt accidentally by the object hung on the hook member 10. Besides, the latch member 40 is provided on the operating portion 12e that makes the user may hold the hook member 10 and operate the latch member 40 with one hand, which is very convenient to the user.

The description above is a few preferred embodiments of the present invention. The equivalence of the present invention is still in the scope of claim construction of the present invention.

What is claimed is:

1. A locking hook, comprising:
   a hook member having a first portion, a second portion, and a gripping portion, wherein the gripping portion has at least a connecting portion and a hollow portion for a user to grip the gripping portion; the connecting portion has an end affixed to the first portion; the first portion has an operating portion on a side thereof; and a width of the operating portion is substantially equal to a width of the end of the connecting portion;
   a lock member pivoted on the first portion of the hook member to be turned between a first position and a second position, and having an end portion and a protrusion, wherein the end portion touches the second portion of the hook member when the lock member is turned to the first position; the protrusion is moved in a moving path as the lock member is turned between the first position and the second position, and the moving path is a curve path with a center of curvature, which is a center of rotation of the lock member; and the protrusion has a stop face; and
   a latch member provided on the operating portion of the hook member to be moved between a lock position and an unlock position, wherein a moving path of the latch member is parallel to the center of rotation of the lock member; further wherein the latch member has a large diameter portion and a small diameter portion; when the latch member is moved to the lock position and the lock member is turned to the first position, the large diameter portion is moved to the path of the protrusion, and touches the stop face of the protrusion to restrict the lock member at the first position.

2. The locking hook as defined in claim 1, further comprising a spring received in a through hole on the first portion of the hook member, wherein the latch member is received in the through hole; and the spring has opposite ends respectively urging a stop face at an inner end of the through hole and the latch member.

3. The locking hook as defined in claim 2, wherein the through hole is open on a side of the operating portion of the hook member to form an opening; and through hole does not extend to an opposite side of the operating portion of the hook member to form the stop face.

4. The locking hook as defined in claim 2, further comprising a pin, wherein the hook member has a pin hole, which is communicated with the through hole; the latch member is provided with an elongated slot on the large diameter portion; the elongated slot is parallel to a longitude direction of the latch member; the pin passes through the pin hole and enters the elongated slot to restrict the latch member to move between the lock position and the unlock position.

\* \* \* \* \*